Sept. 9, 1969    A. I. ARNELO ET AL    3,466,536
MAGNETIC TESTING APPARATUS FOR HELICAL WELDS WHICH FOLLOWS
THE WELD WITH A RECIPROCATING MOVEMENT
Filed Jan. 27, 1967
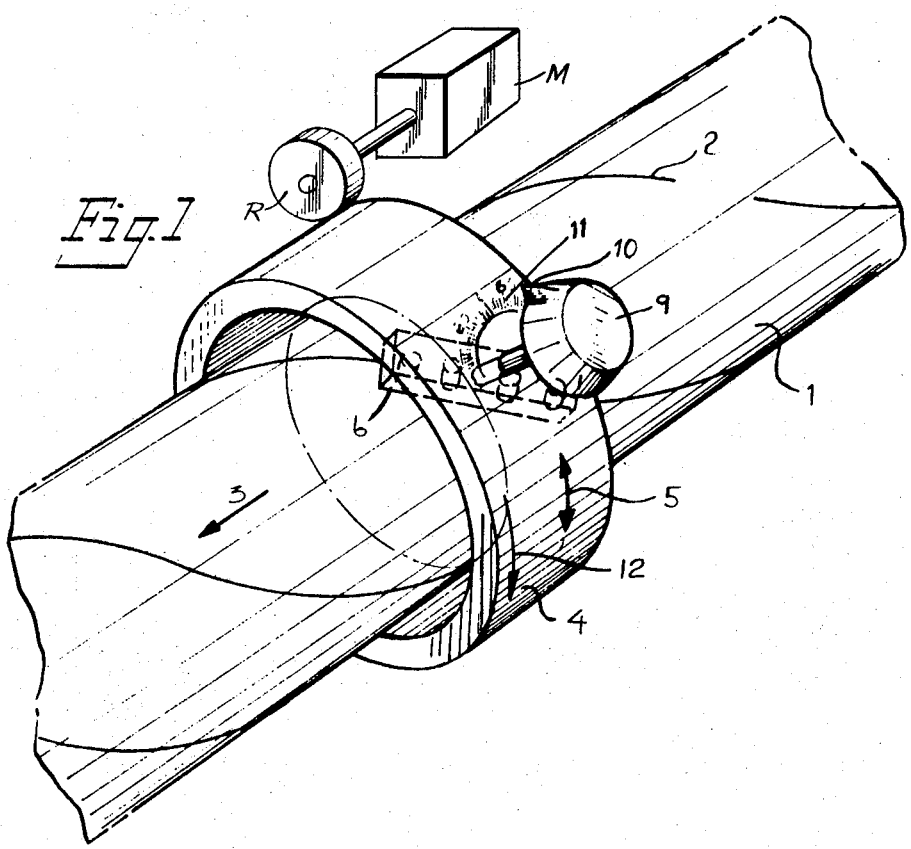
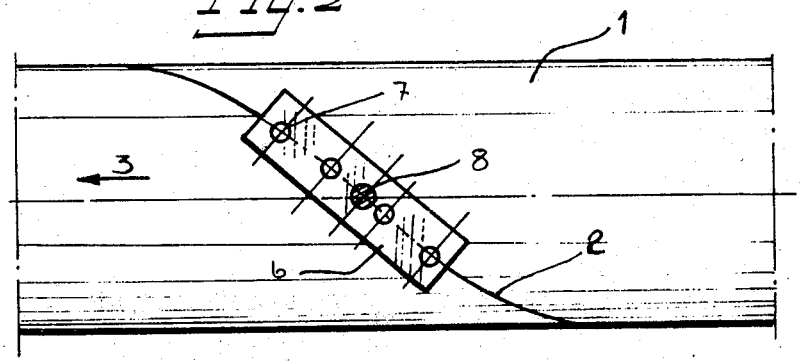

United States Patent Office 3,466,536
Patented Sept. 9, 1969

3,466,536
MAGNETIC TESTING APPARATUS FOR HELICAL WELDS WHICH FOLLOWS THE WELD WITH A RECIPROCATING MOVEMENT
Anders Ingvar Arnelo and Kurt Nils Sture Leuchovius, Vasteras, Sweden, assignors to Essem Metotest AB, Skultuna, Sweden
Filed Jan. 27, 1967, Ser. No. 612,165
Claims priority, application Sweden, Feb. 24, 1966, 2,433/66
Int. Cl. G01r 33/12
U.S. Cl. 324—37                                        2 Claims

ABSTRACT OF THE DISCLOSURE

Means in the non-destructive testing of metals for testing the weld of a helically welded tube, which means includes a sensor for eddy currents induced in the material during its movement past the coil system; the sensor probing the material of the tube while being rotated relative to the advancing tube and while having the axes of its coils directed mainly radially to the tubular material and permanently located in planes parallel with the helical weld to be tested; and whereby the rotational movement of said sensor comprises a reciprocating component of small amplitude.

---

The present invention relates to an electroinductive sensor for eddy currents induced in a material being tested during relative movement of the material and the sensor.

It is previously known in the non-destructive testing of materials to utilize so-called electroinductive testing. In this context the material to be tested is passed through a coil which is connected to a source of alternating current. An electromagnetic field is formed in the coil and, when the force lines of the field cut the test piece, eddy currents appear in the same which react on the coil and its electrical properties so that these vary as a function of the eddy currents in the sample material, which in turn vary, depending on the different properties of the said sample material. By measuring the electrical data of the coil, it is thus possible to check the properties of the sample material. Since, however, the variations in the property of the coil are very small in themselves, the coil must be included in a bridge or compensation circuit of some arbitrary type and the unbalanced voltage obtained from the bridge must be greatly amplified so that said variations can be indicated. Such bridge circuits are previously known per se and do not constitute a part of the invention proper, and consequently will not be described in detail. A suitable embodiment of such bridge circuits is described, for instance, in the Swedish Patent 179,407 and on pages 92 and 93 in "Progress in Non-Destructive Testing," published by E. G. Stanford and J. H. Fearon, volume 1, Heywood & Company Ltd., London 1958. Electromagnetic testing of material is taken up in more detail in the section "Electromagnetic methods of testing metals" (pages 59–109) in the same book.

The magnitude and extension of the eddy currents are influenced by a large number of different factors, i.e. the coupling between coil and test sample, which depends on material. Other factors are the shape of the sample, its the distance from the turns of the coil to the sample conductivity and its magnetic properties. When testing material for faults by means of the electroinductive method, it is therefore important to eliminate the effects of all factors other than those which are connected with the faults in the material. For this purpose it is necessary, among other things, to adjust the coupling factors to the sample material in question and the variables to be indicated. In the case of small dimensions, such as with rod and tubing, it is expedient to pass the material through the coils when testing. On the other hand, however, it is not suitable to apply this method when testing welded tubing of large dimensions since the coils of the through-pass type would require unsuitably large dimensions, whereby the influence of the existing variables on the coil would be insufficient. Further, in the case of welded tubing only the testing of the weld itself is of interest and should be effected in immediate connection with the same. Consequently so-called surface sensors should be used instead, for examining the material transversely to the direction in which it is advanced.

An arrangement for testing welded tubing, e.g. helically welded tubes, by means of an electroinductive sensor for eddy currents induced in the material of the tube during movement of the same relative to the axial direction of the induction coil system, is mainly characterized in that the induction coil system includes at least two sensing coils adapted to examine the material of the tube during a rotary movement in a direction at right angles to the direction in which the tube is being advanced and that the coils are so arranged that they are constantly located on a line parallel to the direction of the pitch of the helix.

Other characaterizing features are evident from the claims.

An arrangement according to the invention is described in the following with reference to the accompanying drawing, where FIGURE 1 shows such an arrangement in perspective and FIGURE 2 shows a side view of the said arrangement.

Detailed description of invention

In the drawing is shown a tube 1 having a helical weld 2, the tube moving in the direction of arrow 3. A ring 4, to which is imparted a uni-directional rotary movement in the direction of arrow 12 upon which is superimposed a reciprocating rotary movement of a partial turn in the direction of arrow 5, encircles the material 1 of the tube and carries a supporting member or holder 6. The said member 6 supports four sensing coils, for instance 7, and is secured to one end of a shaft 8 which is pivotally carried by the ring 4. Located at the other end of the shaft is an adjusting knob 9 provided with an indicator 10 intended to be set in the direction of rotation while using a scale 11 mounted on the ring.

The sensing coils, e.g. 7, are, for instance, incorporated in a known manner in the branches of a bridge circuit which is adapted to produce an error signal in response to an interruption in the sensed weld 2, for the purpose of actuating a marking means for marking the position where the flaw is located.

The axial direction of the coils 7 extends substantially in the normal direction towards the surface of the tube and the coils are constantly located on a line parallel to the direction of pitch of the weld. In other words the support member 6 is adjusted so that a connecting line between the coils extends in the direction of the weld before testing commences, the adjustment being changed by means of the knob 9 each time material of different dimensions is tested.

The reason why it is desired to constantly obtain test results on a line parallel with the weld is because the structure of the material within a certain area along both sides of the weld differs widely at varying distances therefrom, giving rise to disturbances of such magnitude that it is impossible to obtain a resolution large enough for indentifying flaws in the weld. The method described in the foregoing reduces these disturbances to a minimum.

FIGURE 1 shows that the ring 4 performs a reciprocating movement having a small amplitude during its rotation. This makes it possible for the sensing coil to follow the weld while reciprocating back and forth to scan the weld to detect faults therein. Such movement can be generated by a mechanism M of known type engaging ring 4 through the intermediary of a drive wheel W or gear or such.

The invention is not restricted to the described embodiment, which is intended for non-magnetic material, but may also be applied in the case of magnetic material providing that said material is magnetized in a known manner.

What is claimed is:

1. Apparatus for testing a helical weld in a relatively axially moving tubular material comprising an electro-inductive sensor for inducing eddy currents in said material during movement thereof past said sensor, said sensor comprising a series of sensing coils, means mounting said sensing coils adjacent said tubular material with their axes directed generally radially to said tubular material, and with said coils aligned with one another such that a line perpendicularly intersecting the axes of said sensing coils lies in a plane which extends in a direction parallel to the direction of the pitch of the helical weld, means for relatively rotating said sensor in a first direction about the axis of said tubular material at a speed correlated to the pitch of the axially moving helical weld, and simultaneously relatively rotating said sensor with a reciprocating motion through a small partial turn whereby the relative axial movement of the tubular material and the relative rotational reciprocatory movement of the sensor causes the sensing coils to follow the pitch of the helical weld while at the same time reciprocating the sensing coils across said helical weld, and means connected to said sensing coils for indicating the condition of said helical weld.

2. Apparatus as claimed in claim 1 comprising means for adjusting the sensor to helical welds of different pitches.

References Cited

UNITED STATES PATENTS 3,202,914  8/1965  Deem et al. _____ 324—37

FOREIGN PATENTS 597,671  5/1934  Germany.
694,530  8/1940  Germany.

RUDOLPH V. ROLINEC, Primary Examiner

R. T. CORCORAN, Assistant Examiner